United States Patent

Pagilagan

[11] Patent Number: 5,824,763
[45] Date of Patent: Oct. 20, 1998

[54] PROCESS FOR THE MANUFACTURE OF NYLON COMPOSITIONS WITH IMPROVED FLOW

[75] Inventor: Rolando Umali Pagilagan, Parkersburg, W. Va.

[73] Assignee: E. I. du Pont de Nemours and Company, Wilmington, Del.

[21] Appl. No.: 700,936

[22] Filed: Aug. 21, 1996

Related U.S. Application Data

[60] Provisional application No. 60/002,791 Aug. 25, 1995 and 60/015,862 Jul. 9, 1996.

[51] Int. Cl.6 .............................. C08G 73/10; C08G 69/28
[52] U.S. Cl. ........................ 528/322; 528/170; 528/172; 528/173; 528/183; 528/310; 528/312; 528/315; 528/323; 528/328; 528/332; 528/335; 528/336; 528/349
[58] Field of Search ...................... 528/310, 315, 528/322, 312, 323, 332, 328, 336, 335, 349, 170, 172, 173, 183

[56] References Cited

U.S. PATENT DOCUMENTS

| | | | |
|---|---|---|---|
| 4,195,164 | 3/1980 | Meyer et al. | 528/339 |
| 4,892,927 | 1/1990 | Meyer et al. | 528/324 |
| 4,963,646 | 10/1990 | Galland et al. | 528/347 |

FOREIGN PATENT DOCUMENTS

| | | | |
|---|---|---|---|
| 7-41597 | 2/1995 | Japan | C08K 5/3415 |

OTHER PUBLICATIONS

Philippe Marechal Gaetane Coppens, Roger Legras and Jean–Marc Dekoninck, Amine/Anhydride Reaction Versus Amide/Anhydride Reaction in Polyamide/Anhydride Carriers, *Journal of Polymer Science: Part A: Polymer Chemistry*, 33, 757–766, 1995.

*Primary Examiner*—P. Hampton-Hightower

[57] ABSTRACT

A process is disclosed for preparing a polyamide by polymerizing a diacid and a diamine, aminocarboxylic acid or lactam in the presence of excess of either acid or amine such that the ratio of acid to amine end groups or the ratio of amine end groups to acidend groups in the polymer is at least 2.0:1.0.

2 Claims, No Drawings

PROCESS FOR THE MANUFACTURE OF NYLON COMPOSITIONS WITH IMPROVED FLOW

This application claims the benefit of U.S. Provisional Application No. 60/002,791 filed Aug. 25, 1995, and U.S. Provisional Application No. 60/015,862 filed Jul. 9, 1996.

BACKGROUND OF THE INVENTION

High flow or low melt viscosity is a very desirable characteristic of an injection molding resin. A resin with improved flow can be injection molded with greater ease as it has the capability of filling a mold to a much greater length at lower injection pressures and greater capability to fill intricate mold designs with thin cross sections. Hitherto, improvement in flow (lower melt viscosity) has been accomplished by adding lubricants or plasticizers, or lowering the molecular weight. Although these methods are widely used there are often undesirable effects associated with them. Lowering the molecular weight or using additives as a means to lower the melt viscosity could have adverse effects on mechanical properties.

SUMMARY OF THE INVENTION

A process is provided for the manufacture of polyamides with improved flow during injection molding process. It has been discovered that polyamide resins with highly unbalanced acid and amine end groups have lower melt viscosity than corresponding compositions of the same molecular weight with more balanced end groups. Highly unbalanced acid and amine end groups are obtained by addition of excess amine or acid during manufacture. Diacids, diamines, monocarboxylic acids, and monoamines are commonly used for this purpose. Examples of monocarboxylic acids that may be used to adjust the level of end groups include acetic acid, propionic acid, benzoic acid, and stearic acid, and examples of monoamines that may be used to adjust the level of end groups include ethyl amine, butyl amine, and piperidine. This method for flow enhancement or melt viscosity reduction can be used in conjunction with other well known techniques for flow enhancement or melt viscosity reduction.

DETAILED DESCRIPTION

In general, polyamides are prepared by the reaction of diacids and diamines or aminoacids. The termini of the molecules are, for the most part, acid and amine groups. The relative amounts of the acid and amine end groups may be controlled by using an excess of either acid or amine. However, the effect of the ratio of the end groups on melt viscosity and flow has not been recognized until now.

It has been demonstrated that the melt viscosity or melt flow of polyamides is improved dramatically by unbalancing the acid and amine end groups especially if the ratio of acid:amine end groups or amine:acid end groups is at least 2.0:1.0. This ratio is calculated by determining the number of acid end groups and amine end groups, and then dividing the larger number by the smaller number. That is, the number of end groups that are in excess are divided by the number of end groups that are not in excess.

This invention does not preclude the use of additives such as stabilizers, flame retardants, nucleating agents, tougheners, plasticizers, lubricants, and reinforcing agents, any or all of which may be included with the compositions of this invention.

Polyamide resins and their preparation are well known in the art. These resins are obtained by polymerization of diacids and diacid derivatives with 4 to 16 carbon atoms and diamines with 4 to 14 carbon atoms or by polymerization of aminocarboxylic acids, aminonitriles, or lactams containing 6 to 14 carbon atoms. Some examples of dibasic acids are adipic acid, azelaic acid, sebacic acid, dodecanedioc acid, isophthalic acid, and terephthalic acid. Some examples of diamines are hexamethylenediamine, 2-methylpentamethylenediamine, dodecanediamine, m-xylylenediamine, p-xylylenediamine, and bis(p-aminocyclohexyl)methane. Some examples of aminocarboxylic acids and lactams are 6-aminocaproic acid, 7-aminoheptanoic acid, 11-aminoundecanoic acid, caprolactam, and laurolactam. The acid derivatives herein mentioned belong to the class of esters, amides, acid chlorides, and nitriles. Polyamides formed by polymerization of mixtures of monomers and blends of two or more types of polyamides are also included within the scope of this invention.

The invention is illustrated by the following examples. In the examples, melt flow data were obtained using a Kayeness Melt Indexer, Model D-0053 at 280° C. and a load of 1050 g. Melt viscosity data were determined using Kayeness Rheometer, Model 2052 at 280° C.

Control A

To a pre-evaporator vessel were charged 58.25 lb of nylon 66 salt (concentration of 51.5% by wt) and 1.0 g of polysiloxane antifoam. The mixture was heated and the salt was concentrated by evaporating 12 lb of water. The concentrated salt was then transferred into the polymerization autoclave and heated until the autogenous pressure was 250 psi. Heating was continued and the pressure was maintained at 250 psi by allowing the steam to vent. When the temperature of the mixture reached 240° C., the pressure was reduced slowly to atmospheric. The reaction was allowed to stay at atmospheric pressure for 30 minutes after which time the molten polymer was discharged from the vessel in the form of a ribbon and quenched in water. The polymer ribbon was then fed into a granulator for cutting.

EXAMPLES 1 AND 2

The preparation of Example 1 was essentially the same as Control A. To the mixture of 58.25 lb (concentration of 51.5% by wt) nylon 66 salt and 1.0 g of polysiloxane antifoam, were added 0.60 g sodium hypophosphite monohydrate, 5.30 g of sodium bicarbonate, and 59.0 g of adipic acid. The mixture was heated and the salt was concentrated by evaporating 12 lb of water. The concentrated salt was then transferred into the polymerization autoclave and heated until the autogenous pressure was 250 psi. Heating was continued and the pressure was maintained by allowing the steam to vent. When the temperature of the mixture reached 240° C., the pressure was reduced slowly to atmospheric. The polymer melt was then subjected under vacuum until the agitator torque was about the same as Control A. The polymer melt was then discharged from the autoclave in the form of ribbon, quenched in water, and cut using the granulator.

Example 2 was prepared as in Example 1 with the exception that 80.0 g of adipic acid was used.

| POLYMER | RV | NH2 | COOH | RATIO | % H2O | MELT FLOW (g/10 min @ 280° C.) |
|---|---|---|---|---|---|---|
| Control A | 45.1 | 50.7 | 88.3 | 1.74 | 0.04 | 23.3 |
|  |  |  |  |  | 0.14 | 33.6 |
| Example 1 | 48.5 | 23.9 | 113.4 | 4.74 | 0.04 | 30.0 |
|  |  |  |  |  | 0.14 | 43.2 |
| Example 2 | 48.8 | 13.4 | 122.8 | 9.16 | 0.04 | 43.1 |
|  |  |  |  |  | 0.16 | 49.4 |

RV is relative viscosity, and was measured as follows. A 22+/−0.01 g polymer was dissolved in 200 ml of 90 wt % formic acid (0.11 g of polymer per mol of solvent). The viscosity of the solution was measured in a Brookfield viscometer.

NH2 is the number of equivalents of NH2 per million grams of polymer.

COOH is the number of equivalents of COOH per million grams of polymer.

RATIO is the ratio of the number of end groups of acid or amine in excess, in this case COOH, to the number of end groups of acid or amine not in excess, in this case NH2.

% H2O is the weight percent of water in the polymer.

The data above show that the melt flow of Examples 1 and 2 at each of the two moisture levels are from 29% to 85% higher than Control A.

Control B

Control B was made as in Control A.

EXAMPLE 3

Example 3 was made as in Example 1 with the exception that instead of adipic acid, 100 g of HMD (hexamethylenediamine) solution with a concentration of 80% by wt was added.

| POLYMER | RV | NH2 | COOH | RATIO | % H2O | MELT FLOW (g/10 min @ 280° C.) |
|---|---|---|---|---|---|---|
| Control B | 46.9 | 43.3 | 88.5 | 0.49 | 0.03 | 21.3 |
|  |  |  |  |  | 0.15 | 28.7 |
| Example 3 | 48.0 | 101.5 | 26.7 | 3.80 | 0.03 | 26.5 |
|  |  |  |  |  | 0.17 | 35.0 |

In this example, RATIO was calculated by NH2/COOH because the NH2 end groups were in excess.

Again the data show that Example 3 has 22% to 24% greater flow than Control B.

Control C

A nylon 66 salt solution with a pH of 7.64 and a concentration of 50.8 weight percent and a solution of sodium hypophosphite and sodium bicarbonate were pumped at a rate of 17,322 lb/hr into evaporation vessels where the nylon 66 solution was evaporated at 32 psi and 152° C. A sodium hypophosphite/sodium bicarbonate solution was added at a rate as to incorporate 20 ppm sodium hypophosphite and 220 ppm sodium bicarbonate based on the weight of the polyamide. The concentrated salt was heated to about 208° C. and introduced into a reactor held at 250 psi and evaporation of water was continued by allowing the steam to vent. The low molecular weight polyamide was discharged from the reactor at about 242° C. into a flasher, the pressure was slowly reduced and additional water was removed as steam while increasing the temperature to about 276° C. The material exit the flasher was charged into a vessel maintained at atmospheric pressure and more water in the form of steam was removed. The polyamide melt was then discharged into a vessel maintained below atmospheric pressure and a temperature of about 283° C. where further water removal was effected. The polyamide melt was then extruded through circular die holes, quenched with water, and cut into pellets. The pellets were then surface coated with 0.1 weight percent of aluminum distearate.

EXAMPLE 4

A nylon 66 salt solution with a pH of 7.45 and concentration of 51.5 weight percent was pumped into a preheater at a rate of about 6682 lb/hr where it was heated from about 41° C. to about 55° C. A solution of adipic acid and acetic acid were introduced separately into the salt at such a rate as to afford the desired amine and acid ends. A solution of sodium hypophosphite was also added into the salt at such a rate as to incorporate 75 ppm of sodium hypophosphite in the polymer. The nylon 66 salt solution was then introduced into a prepolymerizer operating at 225 psi and a temperature of around 235° C.

The salt solution was concentrated and the monomers were converted to low molecular weight polymer in this stage. The material from the prepolymerizer was discharged into a flasher where the pressure was slowly reduced and water was separated as steam. The material exit the flasher was discharged into a vessel maintained below atmospheric pressure at a temperature of about 283° C. where further water removal was effected. The polyamide melt was then extruded through circular die holes, quenched with water, and cut into pellets. The nylon pellets were then surface coated with 0.1 weight percent of aluminum distearate.

| POLYMER | RV | NH2 | COOH | RATIO | % H2O | MELT FLOW (g/10 min @ 280° C.) |
|---|---|---|---|---|---|---|
| Control C | 50.2 | 50.2 | 75.7 | 1.51 | 0.06 | 18.1 |
|  |  |  |  |  | 0.14 | 32.6 |
| Example 4 | 51.1 | 23.1 | 83.6 | 3.62 | 0.06 | 35.1 |
|  |  |  |  |  | 0.14 | 41.1 |

In example 4, RATIO was calculated by COOH/NH2, because the COOH end groups were in excess.

The data above again demonstrate the much greater flow of polymer with highly unbalanced end groups (Example 4) compared to one with more balanced ends (Control C).

The melt viscosity of Example 4 was compared with Control C using melt viscosity measured at various shear rates at 280° C. using the Kayeness Rheometer Model 2052. The data are shown below:

| POLYMER | RV | NH2 | COOH | RATIO | % H2O | MELT VISCOSITY (PaS) | | |
| --- | --- | --- | --- | --- | --- | --- | --- | --- |
| | | | | | | 554 l/s | 997 l/s | 2770 l/s |
| Control C | 50.2 | 50.2 | 75.7 | 1.51 | 0.06 | 163.0 | 142.0 | 98.4 |
| | | | | | 0.14 | 112.0 | 99.2 | 73.7 |
| Example 4 | 51.1 | 23.1 | 83.6 | 3.62 | 0.06 | 92.6 | 84.1 | 65.1 |
| | | | | | 0.14 | 79.4 | 71.9 | 56.9 |

In example 4, RATIO was calculated by COOH/NH2, because the COOH end groups were in excess. Also, in Example 4, acetic acid was used.

The melt viscosity data above again show that the polymer with unbalanced ends (Example 4) has significantly lower melt viscosity than Control C. Examples of monocarboxylic acids that may be used to adjust the level of end groups include acetic acid, propionic acid, benzoic acid, and stearic acid, and examples of monoamines that may be used to adjust the level of end groups include ethyl amine, butyl amine, and piperidine.

As was discussed above, in an AABB type of polyamide such as 66, 612, and the like, the end groups may be adjusted also by using an excess of one of the monomers, that is, using an excess of either the diacid or diamine. In Examples 1 & 2 excess adipic acid was used. In Example 3 excess hexamethylene diamine (HMD) was used.

In an AB type polymer (from aminoacid or lactam), the ends are adjusted by adding a diacid, diamine, monocarboxylic acid, or monoamine.

The ratio of $COOH:NH_2$, or $NH_2:COOH$ should be at least 2.0:1.0. There is no higher limit for the excess of either the acid or amine ends per se, but ratios of up to about 25:1 are preferred because resins having ratios greater than 25:1 are difficult to manufacture. A preferred range of ratios is from 3:1 to about 12:1.

As shown in the foregoing examples, the polyamides of this invention have substantially the same relative viscosity (molecular weight) and reduced melt viscosity when compared to polyamides prepared from the same polyamide-forming monomers with a ratio of acid:amine end groups of less than 2.0:1.0. One of the benefits of this invention is that the compositions of this invention have a lower viscosity than compositions of the same molecular weight but which have ratios of amine:acid end groups or acid:amine end groups more evenly balanced than the compositions of the present invention.

Another benefit of this invention is that the compositions of the invention exhibit improved retention of tensile and elongation properties on air oven aging, that is, an aging test conducted in a recirculating air oven at a desired temperature, for example, between 70 and 180° C.

It is understood that the polyamides of the present invention may also contain conventional additives such as flame retardants, lubricants, pigments and dyes, optical brighteners, organic antioxidants, plasticizers, heat stabilizers, ultra-violet light stabilizers, nucleating agents, tougheners, reinforcing agents, and the like.

The compositions of this invention may be used to make injection molded parts, including cable ties, electrical/electronic parts such as connectors, battery seals, and automobile parts such as radiator end tanks.

I claim:

1. A process for preparing a polyamide comprising polymerizing polyamide-forming monomers selected from the group consisting of diacids, diamines, aminocarboxylic acid, lactams and mixtures thereof in the presence of excess of either acid or amine to provide a polyamide having an excess of acid or amine end groups such that the ratio of the end groups in excess to the end groups not in excess is at least 2.0:1.0, wherein the excess acid or amine is a diacid, diamine, monofunctional acid or monofunctional amine, said polyamide having substantially the same molecular weight and a reduced melt viscosity when compared to a polyamide prepared from the same polyamide-forming monomers with a ratio of acid:amine end groups of less than 2.0:1.0.

2. A polyamide polymerized from polyamide-forming monomers selected from the group consisting of diacids, diamines, aminocarboxylic acid, lactams and mixtures thereof in the presence of excess of either acid or amine, said polyamide having an excess of acid or amine end groups such that the ratio of the end groups in excess to the end groups not in excess is at least 2.0:1.0, said polyamide having substantially the same molecular weight and a reduced melt viscosity when compared to a polyamide prepared from the same polyamide-forming monomers with a ratio of acid:amine end groups of less than 2.0:1.0.

* * * * *